United States Patent
FitzGerald et al.

(10) Patent No.: US 7,558,291 B2
(45) Date of Patent: Jul. 7, 2009

(54) DEVICE AND MECHANISM TO MANAGE CONSISTENT DELAY ACROSS MULTIPLE PARTICIPANTS IN A MULTIMEDIA EXPERIENCE

(75) Inventors: Cary FitzGerald, Pleasanton, CA (US); Joe Burton, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 781 days.

(21) Appl. No.: 11/065,258

(22) Filed: Feb. 24, 2005

(65) Prior Publication Data

US 2006/0187967 A1    Aug. 24, 2006

(51) Int. Cl.
H04J 3/06 (2006.01)
(52) U.S. Cl. ...................................... 370/503
(58) Field of Classification Search .................. 370/503, 370/260, 261, 262, 352
See application file for complete search history.

(56) References Cited

U.S. PATENT DOCUMENTS

| | | | |
|---|---|---|---|
| 6,697,097 B1 * | 2/2004 | Parker et al. ............. | 348/14.12 |
| 6,707,813 B1 | 3/2004 | Hasan et al. | |
| 7,280,650 B2 * | 10/2007 | Miao ...................... | 379/202.01 |
| 2004/0057446 A1 | 3/2004 | Varsa et al. | |
| 2004/0119814 A1 * | 6/2004 | Clisham et al. .......... | 348/14.08 |

FOREIGN PATENT DOCUMENTS

WO   WO 2004/077717 A2   9/2004

\* cited by examiner

*Primary Examiner*—Frank Duong
(74) *Attorney, Agent, or Firm*—Trellis IP Law Group, PC

(57) ABSTRACT

A system and method provide for managing presentation delay for presenting media or control information to participants in a multimedia experience. Embodiments provide for determining whether a presentation timing for presenting information to the participants is calculated to correspond with a predetermined presentation timing relationship, and if the presentation timing is calculated to conflict with the predetermined presentation timing relationship, determining one or more delay modifications that are calculated to cause a presentation timing to the participant to correspond with the predetermined presentation timing relationship, and causing the modification to be implemented.

20 Claims, 10 Drawing Sheets

DEVICE AND MECHANISM TO MANAGE CONSISTENT DELAY ACROSS MULTIPLE PARTICIPANTS IN A MULTIMEDIA EXPERIENCE

BACKGROUND OF THE INVENTION

1. Field of Invention

The present invention relates in general to the field of networking. More specifically, embodiments of the present invention relate to systems and methods for providing multiple-user interaction.

2. Description of the Background Art

Mechanisms have long existed for providing a more continuous flow of information to a single user-device user, thereby minimizing waiting, response times and media presentation gaps with respect to the particular user. Compact disc (CD) and digital versatile disc (DVD) systems, for example, buffer real-time features for faster response to current-user control. A display controller and buffer further provide for continuous playback of potentially non-continuous synchronized or non-synchronized media (e.g., audio, video, graphics, text, and so on). The controller operates according to well known algorithms that repeat playback of a media portion, add null data, conduct anti-skip processing, adjust signal levels, and so on as needed, and transfer the media to the buffer. A rendering system further presents the buffered media to a system user via displays, sound systems, and so on. Non-real time controls may also be processed in a similar manner, e.g., for providing menus, chapters or other features.

Other computing systems, such as personal computers (PCs), personal data assistants (PDAs), smart phones, gaming systems, settop boxes, recorders/burners, media nodes,.and so on are similarly configured for quick response. They also tend to include so-called display, decode, playback, anti-skip, (anti-)jitter or encoder controllers and buffers that similarly provide for conducting media and control information presentation, transfer and/or storage.

While media systems may also be interconnected and provide for multiple-user applications, presentation timing is nevertheless considered on an individual-user basis and irrespective of any particular application, if at all. For example, performance monitoring in interconnecting networks has expanded to include real time transport protocol (RTP), real time transport control protocol (RTCP) and other protocols. Such protocols, however, currently report only presentation delays and other performance parameters with respect to individual users, so that the actual performance with respect to an individual user may be compared with the performance promised to the user.

Unfortunately, the individually optimized presentation delays provided by current systems may become problematic in conjunction with high speed optimized systems-particularly with regard to interactive applications. For example, a conferencee receiving a presentation more quickly than other conferencees may respond faster and thus dominate over other conferencees. A remote-education participant who is more quickly presented with questions may dominate over other responding participants. An online gaming user who hears or views instructions, scenes or action before other gaming participants may have an unfair opportunity to react. A online auction bidder who is presented with a bid before other bidding users may have an unfair opportunity to enter a further bid, and so on.

Accordingly, there is a need for a mechanism that enables unfair advantage and/or other problems of existing presentation mechanisms to be avoided.

SUMMARY OF EMBODIMENTS OF THE INVENTION

Embodiments of the present invention provide a mechanism for managing delay across participants in a multimedia experience, thereby enabling unfair advantage and/or problems of existing presentation mechanisms to be avoided. Various embodiments provide for determining presentation timing according to which media and/or control information is presented to participants in a multimedia experience. Various embodiments also provide for comparing such timing to a predetermined presentation timing relationship, and for causing a target timing relationship to be approximated or otherwise implemented.

A predetermined presentation timing relationship in one embodiment corresponds with presenting media and/or control information to all participants at about the same time, or further, at about a same fastest time. The presentation timing relationship may, for example, delay faster presentation to participants as needed for enabling multiple participants to be presented with information concurrently, or may further enable users to be presented with information according to a fastest concurrent or other presentation timing relationship. Another embodiment provides for implementing a predetermined timing relationship (or relationships) that correspond with presenting information to participants at two or more different times, for example, according to participant status (e.g., facilitator, ordinary participant, etc.), mental, physical or situational disability, or other user, device or system considerations. A further embodiment enables a service provider to impose charges for providing one or more timing relationships, while yet another embodiment enables different information presentation timing relationships to be implemented according to time, event and/or other relationship-determining criteria.

Various embodiments also provide for determining an existing participant device presentation timing remotely by a service, application or media provider server, or other computing system. Such embodiments may, for example, utilize presentation parameters determined from participant device information, stored information or information transferred from other computing systems. Further embodiments provide for a remote host, network component or other computing system to effectuate an increased delay by transferring a delay indicator to one or more participant devices and/or by correspondingly delaying transfer(s) of information to one or more participant devices. Embodiments also provide for converging on a predetermined timing relationship through successive presentation delay modifications (delay modification iteration), among still further embodiments.

A delay managing method according to an embodiment of the invention provides for determining whether a current timing for presenting information to two or more presentation participants is calculated to correspond with a predetermined presentation timing relationship. The method also includes causing an increased delay in presenting the information to at least one of the presentation participants according to the predetermined presentation timing relationship, if the current timing is calculated to diverge from the predetermined presentation timing relationship.

Another delay managing method according to an embodiment of the invention provides for receiving presentation delay indicators in which each indicator indicates a prior delay in presenting information to a corresponding participant in a media experience. The method further includes determining whether the the indicated prior delay corresponds with a predetermined presentation timing relationship. If not, then the method transfers a delay modification indicator to at least each non-corresponding participant device for causing such correspondence. Further embodiments may also include a user device presentation control for receiving the delay indicator as a delay parameter and for incorporating the delay modification in a presentation control procedure.

A further delay managing method according to an embodiment of the invention provides for receiving prior presentation delay indicators from each participant in a media experience and determining whether the indicators indicate a correspondence with a predetermined presentation timing relationship among the participants. The method further includes, if a correspondence is not indicated, causing a delay in transferring media/control information to one or more participant devices by an amount corresponding to the non-conformance.

A still further delay managing method according to an embodiment of the invention may be performed by a presentation system. The method provides for the presentation system receiving media or control information, receiving a presentation delay modification calculated to cause a presentation delay of the presentation system to conform to presentation delays of one or more other presentation systems, and modifying a presentation delay otherwise implemented by the presentation system according to the delay modification.

A delay managing apparatus according to an embodiment of the invention provides a machine-readable medium having stored thereon instructions for determining whether a prior timing for presenting information to two or more presentation participants is calculated to correspond with a predetermined presentation timing relationship. The embodiment also includes the machine-readable medium having stored thereon instructions for causing an increased delay in presenting the information to at least one of the presentation participants according to the predetermined presentation timing relationship, if the current timing is calculated to diverge from the predetermined presentation timing relationship. This or other apparatus or system embodiments may, for example, provide a same or different timing relationship, or a same or different fastest time relationship.

A delay managing apparatus according to an embodiment of the invention includes means for determining whether a current timing for presenting information to two or more presentation participants is calculated to correspond with a predetermined presentation timing relationship. The apparatus also includes means for causing an increased delay in presenting the information to at least one of the presentation participants according to the predetermined presentation timing relationship, if the current timing is calculated to diverge from the predetermined presentation timing relationship.

A delay management system according to an embodiment of the invention includes a network system providing media, two or more presentation systems coupled to the network system for presenting the media, and a delay management engine coupled to the network system, the delay management system modifying a presentation delay of the presentation system by an amount calculated to conform to a predetermined delay relationship.

Advantageously, coordinated presentation timing of more than one user system according to embodiments of the invention enables problems such as unfair early response opportunity to early presentation, unfair late response opportunity to late presentation, undesirable skewed responses, and so on to be avoided. Embodiments also enable fastest or otherwise measured same or different timing relationships to be implemented or provided as a premium or other paid service. Other advantages enabled by embodiments of the present invention will also become apparent in view of the discussion that follows.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Figure 1A:
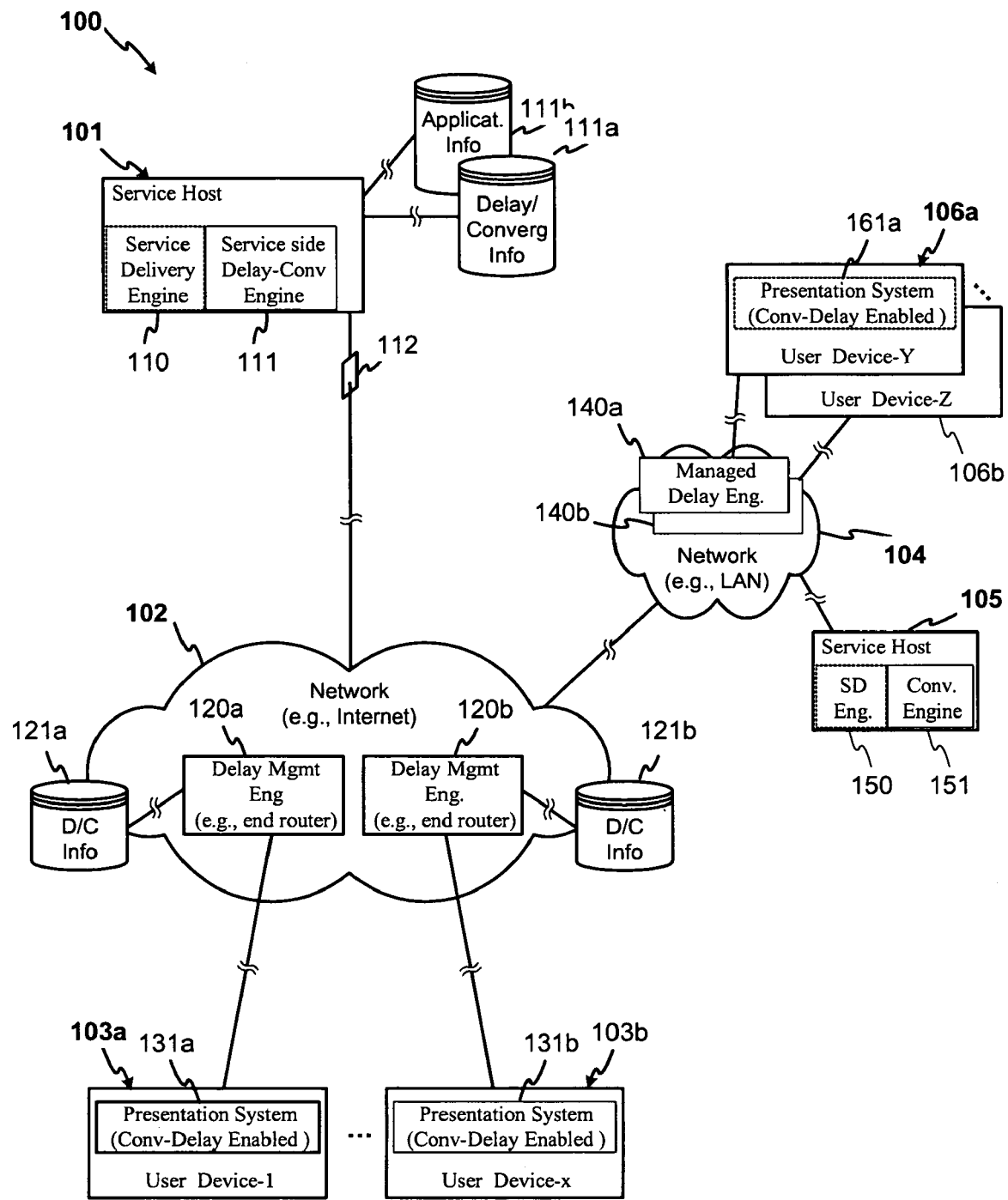
FIG. 1a is a flow diagram illustrating a delay management enabled network system according to an embodiment of the invention.

Referring now to FIG. 1a, there is seen a flow diagram illustrating a (delay management enabled) network system 100 employing various delay management system examples according to embodiments of the invention. Network system 100 broadly provides for conducting a delay managed multimedia experience or "presentation session" among two or more participating user device users (participants) within which delay management is incorporated. The multimedia experience may, for example, include conferencing, remote education, media-on-demand, gaming, interactive television, auctioning or other applications during which two or more (multiple) participant users may interact or otherwise be presented with one or more types of synchronized or non-synchronized media or control information (multimedia information). The multimedia experience or presentation session may farther be conducted by one or more of participant user devices or service hosts (e.g., servers) in an otherwise conventional manner, but subject to delay management, or may be modified to further facilitate a particularly delay managed multimedia experience.

Within network system 100, various delay management system embodiments broadly provide for modifying, as needed, presentation timing otherwise used to present media/control information to one or more participant users (participants) so that the resultant presentation timing is calculated to correspond to a presentation timing relationship determined by the delay management system(s). A more specific "similar timing" embodiment, for example, provides for determining a presentation timing relationship as including a substantially similar or same presentation timing, and for causing an increased presentation delay that effectively slows earlier presentation otherwise provided by one or more participant user devices or "presentation devices" to conform to the presentation timing relationship. Various embodiments may further provide for a fastest or slower presentation timing in accordance with a presentation timing relationship.

The presentation timing relationship is preferably determined prior to imposing a presentation timing modification (or "predetermined") and may, for example, provide for presenting information to participants at substantially the same time (e.g., providing similar opportunity for participant viewing/responding) or at different times (e.g., according to ordinary, officiator or other status, physical/mental infirmity or other fixed or configurable delay management or multimedia experience criteria). The presentation timing relationship may also be implemented in a variable manner during a same or different multimedia experiences according to an occurrence of one or more of timing, event and other criteria, or in conjunction with a premium service provided by a service provider in accordance with the requirements of a particular implementation. The presentation timing relationship may, for example, be determined as an individual or group presentation timing or timing relationship according to fixed or variable criteria that may be stored, received or otherwise processed by a delay management system.

Various embodiments further provide for implementing a presentation delay convergence, for example, causing presentation timing modifications to be implemented as two or more modification iterations that are calculated to (actually or likely) correspond with the presentation timing relationship. One embodiment, for example, determines a current presentation timing modification as corresponding to a difference between a prior timing indicator and the predetermined presentation timing relationship. Those skilled in the art will appreciate that actual presentation timing may vary due to one or more delayed information portions, processing deviations or other factors, such that the modification may effectively become a calculated approximation. More typically, implementing a timing relationship includes causing an increased delay of a presentation to one or more participants or modifying an intermediate modification according to a prior delay or delay modification, for example, in a later delay convergence iteration, in a manner calculated to conform to the presentation timing relationship.

Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise.

In a more specific embodiment, an application/service host (e.g., network server) is at least intermittently communicatingly coupled to two or more participant user devices. The service host provides for conducting or otherwise facilitating an education, conferencing or other multiple user application with participant user device users in an otherwise conventional manner that may further employ delay management. Service host 101 may, for example, be coupled via network 102 and invoke service engine 110 for providing applications to user devices 1 through N 103a, 103b, or further via network 104, to user devices Y through Z 106a, 106b. In other embodiments, service host 101, service host 105, other service hosts or some combination may also be used in a more centralized or distributed manner to service various user devices coupled to various physical or virtual networks or network portions.

Service engine 110 may, for example, retrieve computer code from service host storage 111b for providing one or more of scheduling an application presentation session/participants, providing reminders, initiating a session, conducting log-in, encryption or other security, or other such processing in accordance with the requirements of a particular implementation. Service engine 110 may further provide for initiating and transferring any applicable server-based, downloadable or mobally executable application code (e.g., applets), initialization information and so on. Such initialization may also be conducted locally by one or more of user devices 103a, 103b, 106a or 106b, or some combination may be employed.

Service engine 110 may also provide for transferring/receiving media or control information to or from participant-user devices during a presentation session. For example, during a conferencing session, service host 101 may operate as an intermediary component for receiving, filtering, re-transmitting or otherwise processing participant voice media (e.g., using voice-over-IP or VoIP) or provide for more direct participant utilization.

Service host 101 may also operate as a repository for graphic, audio, video or other media that service engine 110 may retrieve and present to participants or receive from participants and temporarily or more persistently store during a presentation session, among other application/service processing. It will be appreciated that these or other media/control information may also be transferred among user devices without the use of service host 101, in accordance with the requirements of a particular application.

Presentation delay-convergence engine (delay engine) 111 is provided in embodiments in which intra-network delay management operation may be conducted in whole or part by a service host for conducting such delay management. In other embodiments, one or more of service host 101, service host 105 or other intra-network components may also include components for conducting intra-network delay management operation in a more centralized or distributed manner. (The terms intra-network component and intra-network device are used herein to refer to a network component or device other than a user device or a participant device)

Figure 1B:
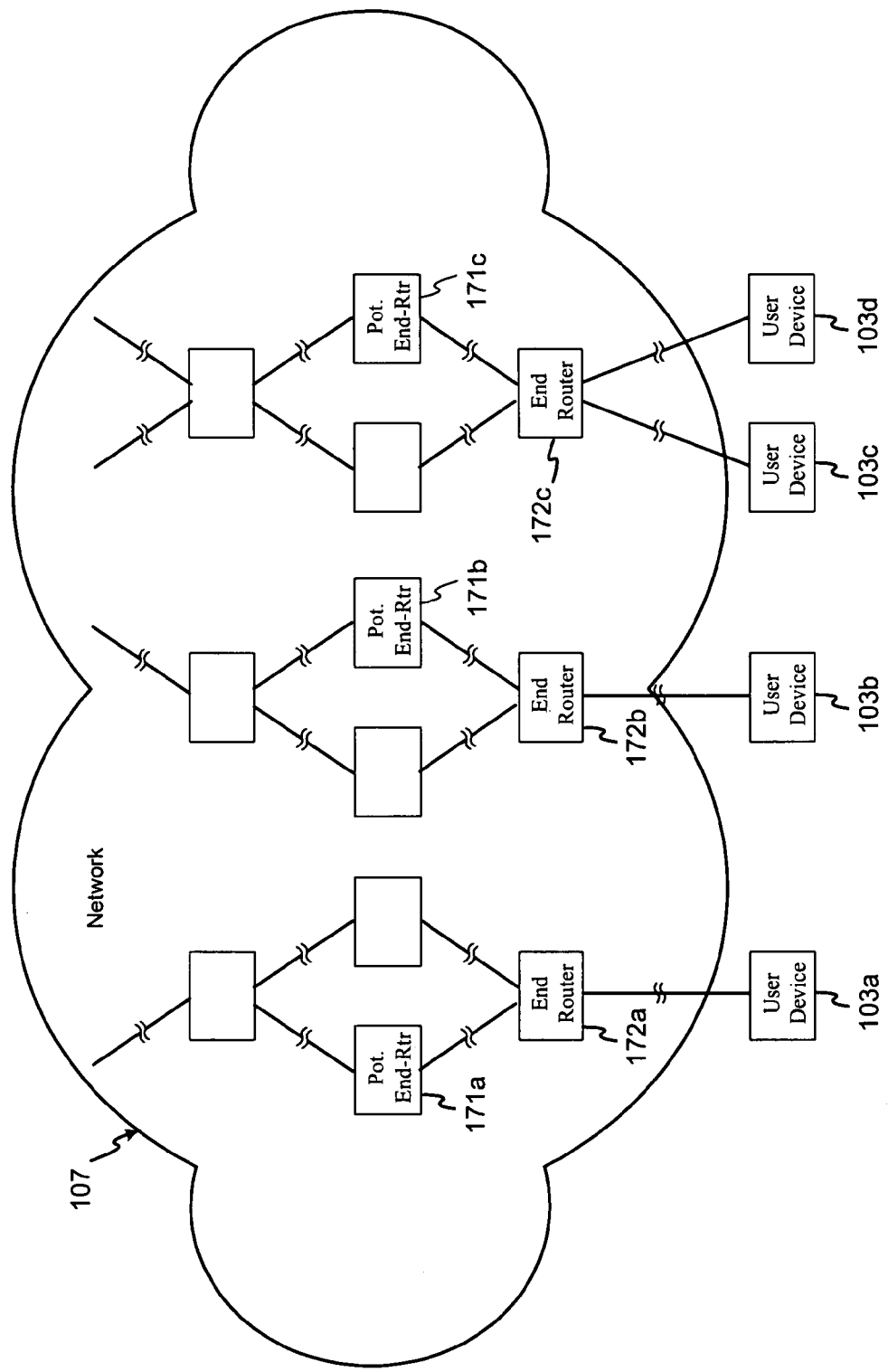
FIG. 1b is a flow diagram illustrating a selection of end router devices in conjunction with the network system of FIG. 1a, according to an embodiment of the invention.

Various embodiments may also utilize different components or component combinations for conducting delay management operations. FIG. 1b, however, shows how using for intra-network delay management a component having too remote a transfer proximity with a corresponding presenting device may result in timing inaccuracies, lost delay management opportunity or unnecessary transfer/processing delay, among other potential problems—particularly with real-time presentation. Network 107 may, for example, include various network components that may be coupled to user devices 104a-d during a given presentation session. Utilizing intra-network components 171a-c, however, may result in greater transfer delays than using end-devices 172a-c. Components 171a-c also may not, in a given instance, be included in a transfer path used in conjunction with user devices 103a-d. Contrastingly, end devices 172a and 172b have more reliably included transfer paths and close proximity for conducting delay management in conjunction with corresponding user devices 103a and 103b respectively; end device 172c also has a more suitable transfer path and close proximity for conducting delay management in conjunction with corresponding user devices 103c and 103d. Care should therefore be exercised in selecting suitable components in accordance with the requirements of a particular implementation. For clarity sake, intra-network delay management components will hereinafter be referred to as "end routers" regardless of particular component or components that may be used.

It should be noted, however, that none of end devices 172a-c of FIG. 1b may receive information directly from all of user devices 103a-103d. The present embodiment of FIG. 1a therefore includes delay engine 111 providing a centralized node for conducting at least one real-time delay management operation, or those operations relating to all corresponding participant user devices. Delay engine 111 operation may further be configured to correspond with application services (e.g., as conducted by service engine 110).

Delay engine 111 may, for example, provide for exploiting typically greater service host processing/storage resources by retrieving applicable program code or parameters or other data information from delay-convergence storage 111a and transferring such information to one or more corresponding end routers as needed. Delay engine 111 may further perform initialization responsive to invocation by service engine 110, enabling selective utilization or configuration of end routers for performing delay management in accordance with service application requirements. Delay engine 111 may also provide for determining one or more of a static, initial or subsequent presentation timing relationship or a corresponding delay amount (e.g., a total delay according to the relationship) corresponding to one or more user devices, and transferring the relationship or delay amount information, or portions thereof, to corresponding ones of end routers 103a-b. Delay engine 111 may also determine at least an initial modification for one or more user devices and transfer the modification to the user device(s).

A presentation timing relationship may, for example, be determined as a default relationship (e.g., concurrent presentation delay or fastest concurrent presentation delay), by retrieving a timing relationship stored in storage 111a (e.g., as a static, initial or ongoing criteria provided by a corresponding service engine application), according to system user criteria (e.g., status, infirmity, etc.), and so on, in accordance with the requirements of a particular implementation. An initial delay amount or modification may further be determined, for example, by comparing a relationship parameter corresponding to a participant user device with known delay information of a same user device or of a user device that is similarly situated (e.g., same device type or device, similar transfer parameters, and so on). An ongoing delay or modification may be determined, for example, by comparing a relationship parameter corresponding to a user device with prior delay information of the user device during a prior presentation session (e.g., see below). Determination of a presentation delay modification or modifications for respective devices and implementation of the modification may also be conducted by a corresponding end router in accordance with the present embodiment (e.g., see above).

Networks 102 and 104, in addition to at least intermittently coupling service host 101 (or 105) with ones of participant device users 103a-b, 104a-b, may also provide for implementing intra-network delay management control. Network 102 may, for example, include a wide area network (WAN), such as the Internet, or other suitable real or virtual network. Network 103 is further illustrated as an example of a local area network (LAN), such as a corporate intranet or private network, that may be utilized alone or in conjunction with network 102 for coupling other components, initiating or conducting one or more localized or distributed applications, or initiating/conducting one or more localized or distributed delay management portions.

Within network 102, network components such as wired or wirelessly coupled gateways, routers, and so on may be used in an otherwise conventional manner for receiving and directing typically packets of control/data information to target network end stations or intra network nodes. The present embodiment also provides for such component use to include conducting delay management. Ongoing delay management is more preferably conducted by one or more routers that are most directly coupled to corresponding participant user devices (or "end" routers), for example, end routers 120a and 120b. (Delay control devices 140a and 140b, also comprise end routers with respect to network 104 and user devices 106a and 106b, or further, network 102 and user devices 106a and 106b, and may be used in a similar manner as with end routers 120a and 120b.

As was already discussed, end routers 120a and 120b are operable in various embodiments that may include a service host application. In one embodiment, end routers 120a and 120b provide for receiving program code for performing delay management operations and for releasing end router resources used in delay management when not performing corresponding delay management operations. The program code may also include a presentation delay relationship indicator indicating one or more of presentation delay or delay modification information corresponding to one or more participant user devices that are proximately coupled to a respective end router. (Each end router may also receive one or more further delay relationship indicators in implementations in which the delay relationship may vary, for example, as was already discussed.

In another initialization embodiment, each end router retrieves delay management program code stored in a corresponding delay-convergence storage (e.g., storage 121a). An end router that corresponds to less than all participant user devices may also receive from a service host (or other network component) an initial presentation delay relationship indicator or presentation timing relationship information corresponding to the remaining user devices from which an the end router may determine such relationship, a delay indicator or a delay modification for conforming to a current relationship. It will be appreciated that application service or delay management components may be hardwired or a combination of these or other implementations may be utilized.

Each of end routers 120a and 120b also provides for determining whether a current presentation timing of one or more corresponding participant user devices is calculated to correspond with a predetermined presentation timing relationship.

In one correspondence determining embodiment, end router 120a receives from delay engine 111 a presentation relationship corresponding to devices to which the end router does not correspond and determines delay information for the corresponding user device(s), or end router 120a receives delay information for the corresponding user device(s). End router 120a further compares the delay indicator with current presentation delay information of a corresponding user device to form a delay modification (e.g., using simple subtraction or other processing).

In a further delay convergence determining embodiment, end router 120a instead determines whether a correspondence exists by comparing a prior presentation delay with a delay indicator as an intermediate delay modification. It will be appreciated, however, that a user device presentation system may be subject to some presentation delay variability during a presentation session (e.g., due to a lost or delayed packet, anti-skip, presentation system configuration, and so on). Thus, the prior presentation delay information may not have been an accurate indicator of subsequent presentation delay and potential under-modification or over-modification may result. Errors may also occur in conjunction with an initial presentation, where a current presentation delay may be unknown. The end router therefore also compares the earlier presentation delay information modification and prior presentation delay to determine whether a correction to the intermediate modification is needed. If so, then the end router adjusts the intermediate modification according to the correction to form a presentation delay modification (e.g., correspondingly increasing/decreasing the amount according to difference, percentage, and so on). Other end routers used in a current presentation session are also operable in a similar manner.

It should be noted that in other embodiments, a degree-of-error, weighted determination or other criteria may also be used to determine whether a correction should be conducted (e.g., amount, percentage, and so on) or other convergence or correction processing may also be conducted in accordance with the requirements of a particular implementation.

End routers 120a and 120b further provide, if a lack of correspondence is found between a prior presentation delay and a presentation delay relationship, for causing a next presentation delay to be modified, preferably by the an amount corresponding to the delay modification.

Various system 100 embodiments also provide for applications in which one or more participants may be considered trusted or not trusted. Trusted participants include those for which tampering with delay management parameters or operations conducted by a participant device or devices may not be expectable, while some degree of tampering with a not trusted participant device or devices may be expectable. Various embodiments provide for utilizing parameters or operations of a trusted partipant device or devices for implementing delays, for utilizing intra-network devices for such parameters or operations in conjunction with not trusted participants, or some combination, for example, where trusted and not trusted participants may participate in a media session.

In one trusted participant embodiment, each end router implements a delay modification by transferring an indicator indicating a delay modification to a display or other presentation buffer control of corresponding participant user device. The delay modification indicator may then be used by the buffer control as an additional presentation processing parameter in addition to parameters otherwise used. While a delay may be implemented in other ways (e.g., adding an initial or other presentation delay, manipulating the buffer, and so on), the present embodiment enables advantages of delay management to be achieved with little added complexity.

It should be noted, however, that while this or other trusted participant embodiments may advantageously provide for delay management on media or control information irregardless of the source of the information (e.g., public/private network, local hard/removable storage, and so on), a degree of participant trust is assumed. For example, locally provided presentation information or a combination of local and remote presentation information may be used in conjunction with delay reporting that, unlike present RCTP, may report presentation information from different information sources. Such sources may, for example, include but are not limited to a conference, game, education, sweepstakes or other "application" in which remote information may add to or update or otherwise modify the local information or visa versa. It is possible, however, that a participant user device may be modified to provide false presentation delay information or otherwise circumvent the delay modification.

A tamper avoidance embodiment therefore provides for each end router to delay transfer of received media or control information to be presented by an amount of time corresponding to the delay modification. While this embodiment assumes receipt of presentation information by the end router, it does not require modification of the user device presentation control mechanism and is less susceptible to tampering.

User devices 103a-b and 106a-b may include computing devices that are capable of providing for presentation of the aforementioned media or control information, and for providing to a delay management system or end router the aforementioned presentation delay information and, in a trusted participant embodiment, receiving from a delay management system or end router and incorporating a delay modification parameter. A user device may, for example, include real time transport protocol (RTP), real time transport control protocol (RTCP) or other protocols that provide for delay parameter reporting in accordance with a tamper avoidance implementation. However, a trusted participant embodiment may require some modification to such protocols to further provide for receiving and incorporating at least one external parameter (i.e., delay modification) within a presentation control algorithm.

Firewall 112 is illustrative of a wide variety of security mechanisms, such as firewalls, encryption, fire zone, compression, secure connections, one or more of which may be used in conjunction with system 100. Many such mechanisms are well known in the computer and networking arts.

Figure 2A:
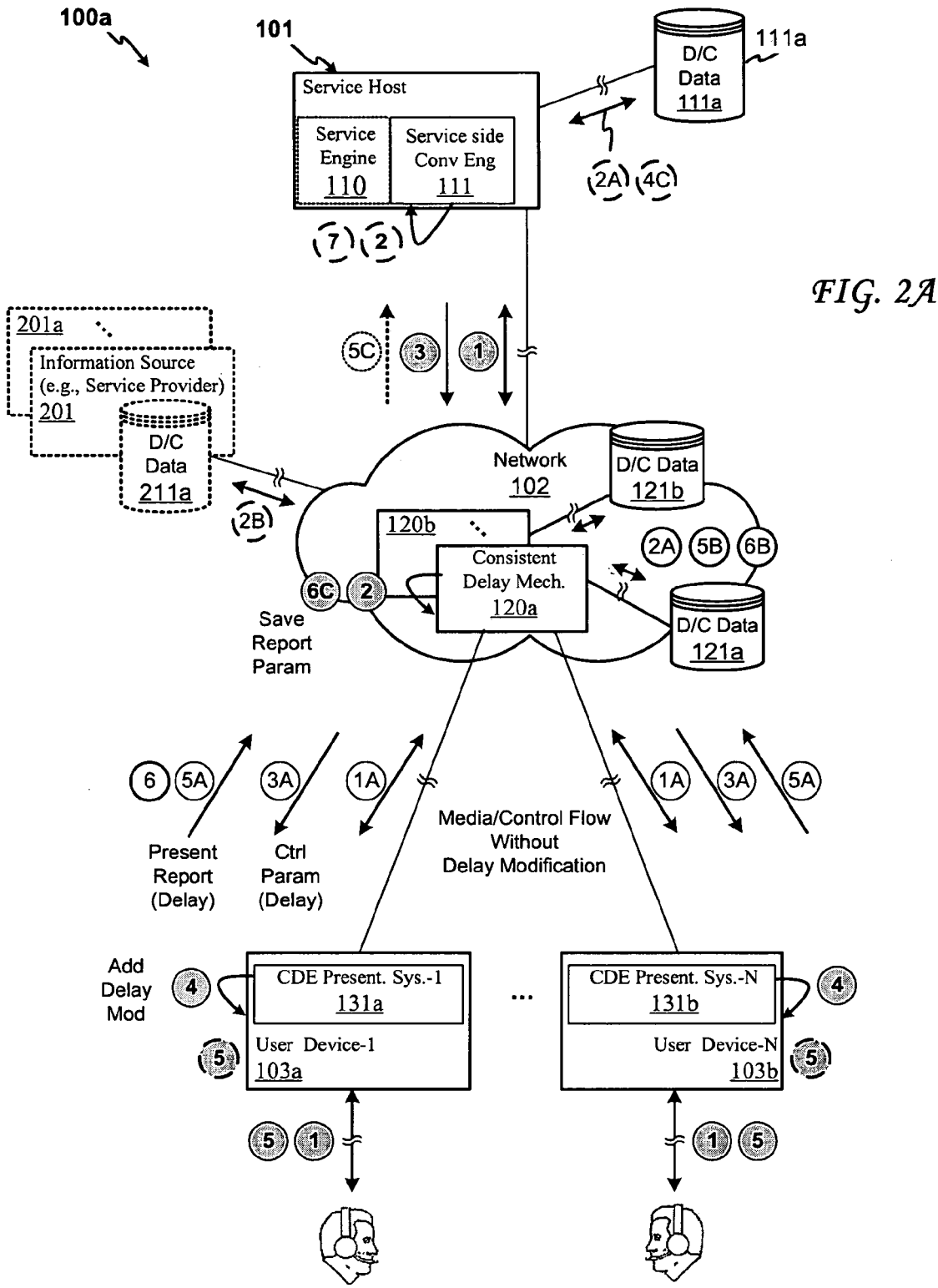
FIG. 2a is a flow diagram illustrating an operation of the delay managing system of FIG. 1 according to an embodiment of the invention.
Figure 2B:
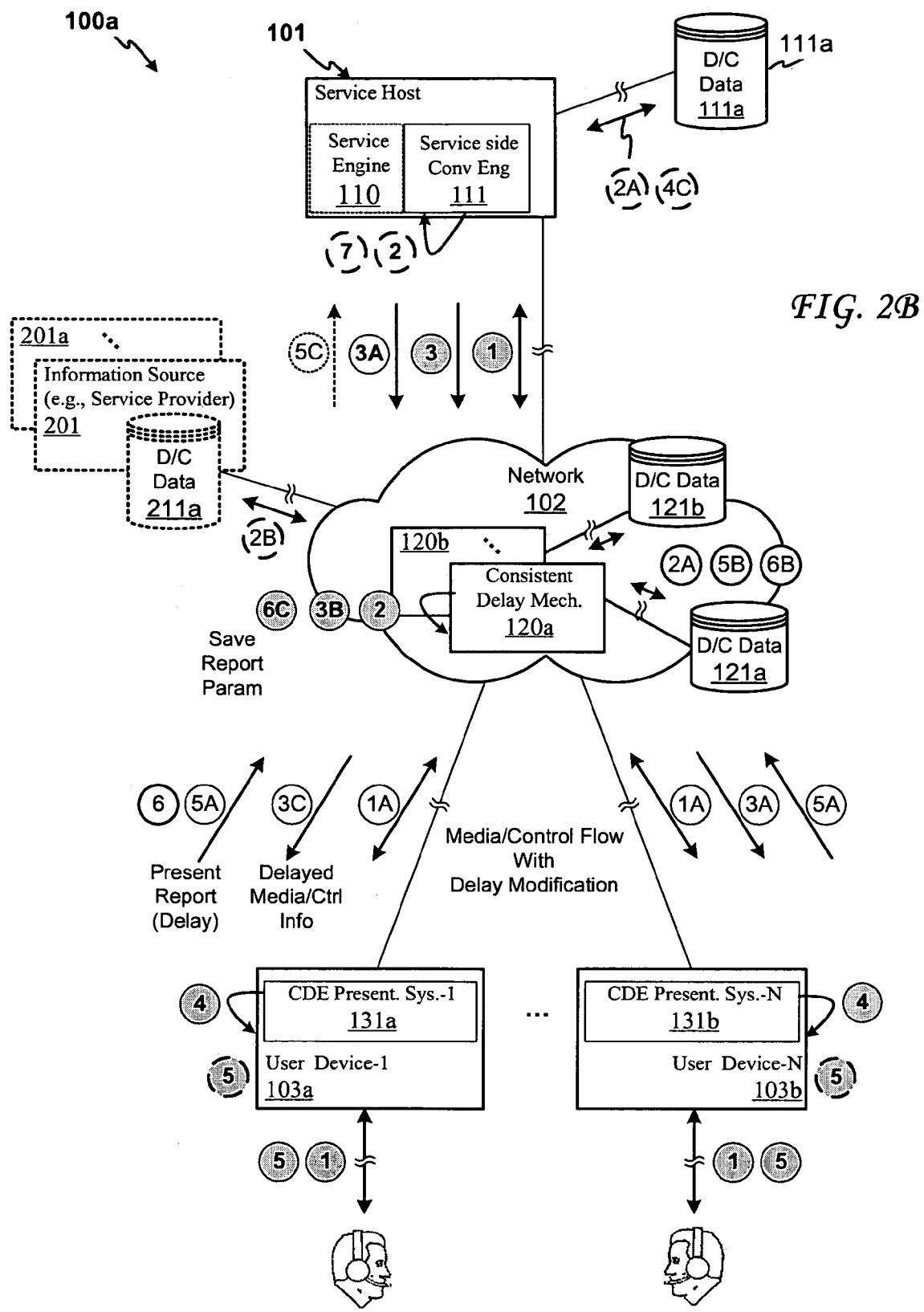
FIG. 2b is a flow diagram illustrating a further operation of the delay managing system of FIG. 1 according to an embodiment of the invention.

FIGS. 2a and 2b illustrate exemplary delay management operation utilizing the network system 100 of FIG. 1. FIG. 2b illustrates a further delay management operation example that replaces the trusted participant delay modification implementation of FIG. 2a with a tamper avoidance delay modification implementation.

Beginning with FIG. 2a, the illustrated delay management process includes an initiation of a multiple user presentation session (item 1). The initiation may include participant users of user devices 103a, 103b joining a session conducted by service engine 110 of service host 101 (e.g., logging on to the session) or may be initiated by service engine 110, or some combination. The initiation may further include one or more of service engine 110 and user devices 103a, 103b conducting applicable security, and may also include transfer or initialization of applicable application code, e.g., via one or more of service engine 110 downloading the code to the user devices, mobally executable code, remote execution by service engine 110 or local user device initialization (item 1A).

While the present process may utilize in a new manner RTP, RTCP or other end device or other protocols that provide for delay parameter reporting, such protocol(s) may more typically be conducted as a part of an application presentation session. RTCP and other protocols, for example, provide to a service host a periodic presentation reporting that includes an indicator indicating an absolute, averaged or other presentation delay. The RTCP report or other reporting is also received by devices within the user device-to-host transfer path, and while conventionally only re-transmitted by such devices, may be stored or otherwise utilized by end routers 120a-b in conjunction with delay management. Presentation control is also included in the conducting of ordinary media presentation. It should be noted, however, that present embodiments may utilize presentation control in a new manner (e.g., providing to the control a delay modification parameter for use as part of the control algorithm and that may modify a delay otherwise conducted.) Therefore, a degree of modification may be required using a presentation control that does not ordinarily provide for inclusion of externally originated parameters.

Item 1 also illustrates how the initiation process may also include delay engine 111 similarly initiating a delay management system. As with the presentation session, such initialization of code, parameters or other data may also include the use of one or more of downloading, mobally executable code (e.g., applets/servelets) and local initiation (including any initialization). As was noted earlier, delay management system initialization or further operation may be conducted in a coordinated manner with a presentation session (e.g., including service engine 110 invoking delay engine 111, providing to delay engine 111 or via delay engine to end routers 120a-b user information, user device information, presentation delay relationship criteria, and so on).

Items 2 through 3 further illustrate how delay engine 111 or one or more end routers 120a-b may determine a presentation delay relationship and initial delay modification. The present embodiment may include the end routers 120a-b retrieving a presentation delay relationship (item 2) or criteria for forming such relationship (item 2a) from storage 121a-b respectively, unless the relationship is received from service or delay engines 110, 111 in conjunction with a presentation application or session. (End routers 120a-b may also exchange information pertaining to non-corresponding user-devices as needed.)

End routers may also determine an initial delay modification as corresponding to default delay information or delay information received from the same participating user devices and stored in storage 120a-b during a prior session (item 2a), via transfer from the user devices (not shown) or from information obtained from a third party (item 2b). Delay management provider, presentation service provider or third party information may, for example, include delay information corresponding to a device type or device. (Delay information may, for example, include absolute, configuration range or other user or third party information obtained during registration, service, and so on.) Such information may also include information relating to a prior conducting of the same or a similar presentation or included transfer(s) by other similarly situated users, e.g., conferencing from the same or similar locations or within broader areas as may be available. Item 3 shows how a delay engine 111 may also determine and transfer presentation delay relationship or delay information to end routers 120a-b, for example, as was discussed with reference to FIGS. 1a and 1b.

Item 3a further includes end routers 120a-b transferring a delay modification, as needed, to corresponding ones of participating user devices 103a-b. In item 4, the delay-convergence enabled presentation systems 131a-b of user devices 103a-b that receive delay modifications may utilize such modifications to modify an otherwise utilized presentation delay (e.g., by causing a presentation control algorithm to include the received delay modification).

In item 5, presentation information is presented to a respective participating user. The information may, for example, include voice or other media or control information spoken or otherwise input by another participant, or media or control information received from host 101, another computing system or local storage. Note that, in a delay convergence embodiment, the end router may further store the modification information for use in conducting delay modification error correction in a next or further iteration.

Item 5 also provides for a user providing input (e.g., responding to presented information, if the user responds), and items 5a-b provide for transfer of any user input via a corresponding end router or other network nodes to one other participant user devices or service host 101.

Items 6 through 6a further illustrate how a participant user device may (synchronously or asynchronously) generate an RTCP or other presentation report (item 6) and transfer the report to a corresponding end router (item 6a). The end router may store presentation delay information for use in a further convergence iteration (item 6b), and in item 6c, determines whether the current presentation delay is calculated to correspond with the presentation delay relationship.

Item 6c further indicates how an end router re-transmits the RTCP or other presentation report to delay service host 101 for conventional reporting or other uses in accordance with the requirements of a particular implementation. The end router may also provide to other end routers, service host 101 or other computing systems (e.g., via a suitable push/pull mechanism) statistical or other information corresponding to delay management. Finally, item 7 illustrates how delay engine 111 may also, in a particular embodiment, conduct delay modification as needed with regard to media or control information received by delay, or service engine 110 or delay engine 111 may determine a further delay management criteria, a delay relationship or other information, which information may be used in current or subsequent delay management.

Continuing with FIG. 2b, items 1 through 3 and 5 through 7 of the illustrated tamper avoidance operation example may be conducted in the same manner as with similarly numbered items of the trusted participant operation of FIG. 2a. Items 3a through 4, however, are replaced as follows. In item 3a, an end router (e.g., 120a) receives from service host 101, user device 103b or another coupled computing system media or control information for presentation by a user device. In item 3b, the end router delays transferring the information to the corresponding user system(s) by an amount of time corresponding to the presentation delay relationship and then transfers the information to the user system(s) in item 3c. In item 4, a user device presentation system control may process the information for presentation in a conventional manner.

Figure 3:
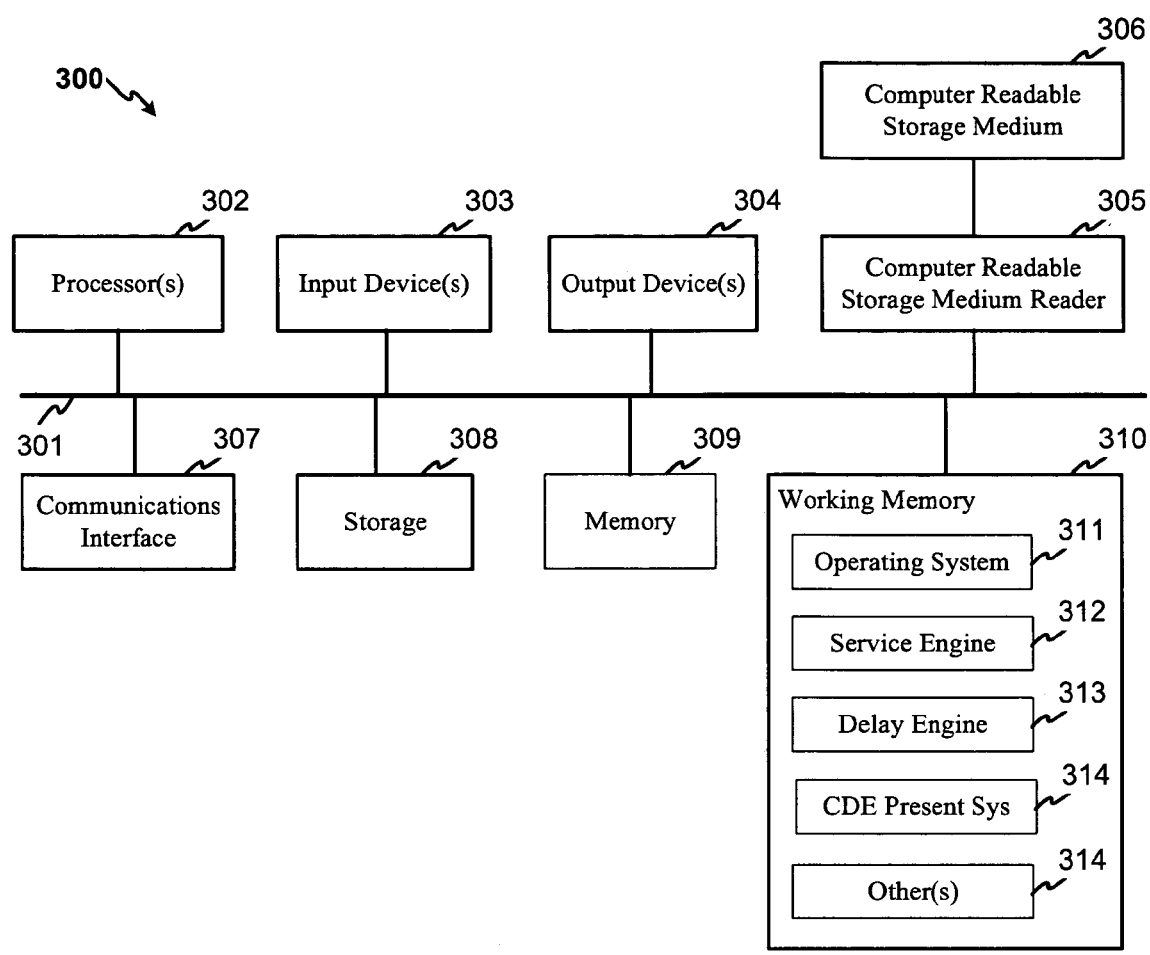
FIG. 3 is a schematic diagram illustrating an exemplary computing system according to an embodiment of the invention including one or more of the components of FIG. 1.

Turning now to FIG. 3, an exemplary computing system is illustrated that can comprise one or more of the components of FIG. 1. While other alternatives might be utilized, it will be presumed for clarity sake that components of the systems of FIG. 1 and elsewhere herein are implemented in hardware, software or some combination by one or more computing systems consistent therewith, unless otherwise indicated.

Computing system 300 comprises components coupled via one or more communication channels (e.g. bus 301) including one or more general or special purpose processors 302, such as a Pentium®, Centrino®, Power PC®, digital signal processor ("DSP"), and so on. System 300 elements also include one or more input devices 303 (such as a mouse, keyboard, microphone, pen, and so on), and one or more output devices 304, such as a suitable display, speakers, actuators, and so on, in accordance with a particular application.

System 300 also includes a computer readable storage media reader 305 coupled to a computer readable storage medium 306, such as a storage/memory device or hard or removable storage/memory media; such devices or media are further indicated separately as storage 308 and memory 309, which can include hard disk variants, floppy/compact disk variants, digital versatile disk ("DVD") variants, smart cards, partially or fully hardened removable media, read only memory, random access memory, cache memory, and so on, in accordance with the requirements of a particular implementation. One or more suitable communication interfaces 307 can also be included, such as a modem, DSL, infrared, RF or other suitable transceiver, and so on for providing inter-device communication directly or via one or more suitable private or public networks or other components that can include but are not limited to those already discussed.

Working memory 310 further includes operating system ("OS") 311 elements, delay management enabled network system components including, for example, a service engine (e.g., for a service host) 312, a server side or end router based delay-convergence engine 313 or a delay-convergence management enabled presentation system 314 (for a participant user device), and other programs 315 that might be used. It will be appreciated that such components may be included working memory of a hosting device, such as a server or user device, other components not inconsistent with those of FIG. 1 may be included, and so on in accordance with the requirements of a particular application. Working memory components may also include one or more of application programs, mobile code, data, and so on for implementing system 100 elements that might be stored or loaded therein during use. The particular OS may vary in accordance with a particular device, features or other aspects in accordance with a particular application (e.g., using Windows, WindowsCE, Mac, Linux, Unix or Palm OS variants, a cell phone OS, IOS or some other proprietary OS, and so on). Various programming languages or other tools can also be utilized, such as those compatible with C variants (e.g., C++, C#), the Java 2 Platform, Enterprise Edition ("J2EE") or other programming languages in accordance with the requirements of a particular application. Such working memory components can, for example, include one or more of applications, add-ons, applets, custom software and so on for conducting but not limited to the examples discussed elsewhere herein. Other programs 314 may, for example, include one or more of security, compression, synchronization, backup systems, Web browsers, groupware code, and so on, including but not limited to those discussed elsewhere herein.

When implemented in software (e.g. as an application program, object, agent, downloadable, servlet, and so on in whole or part), a document system or other component may be communicated transitionally or more persistently from local or remote storage to memory (SRAM, cache memory, etc.) for execution, or another suitable mechanism can be utilized, and elements can be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Figure 4A:
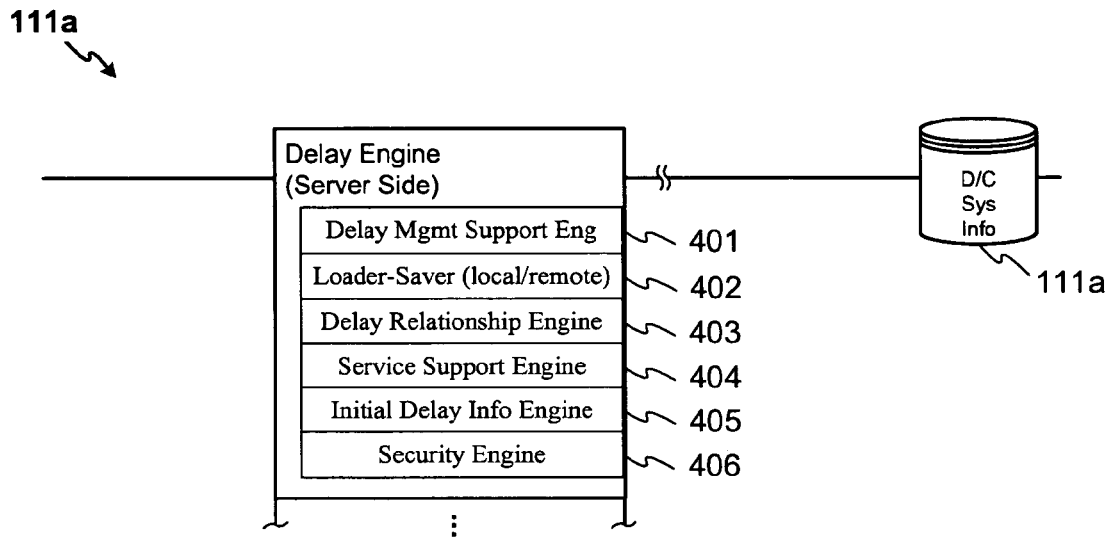
FIG. 4a is a flow diagram illustrating a delay-convergence engine according to an embodiment of the invention.

Referring now to FIG. 4a, there is seen a schematic diagram illustrating, in greater detail, an embodiment of delay engine 111a of FIG. 1 according to the invention. As shown in FIG. 4, delay engine 111a includes delay management support engine 401, loader-saver 402, delay relationship engine 403, service support engine 404, initial delay information engine 405 and security engine 406.

Delay management support engine 401 provides, in an implementation supporting remotely sourced program code, for retrieving from storage 111a (via loader-saver 402) and downloading to one or more end routers or otherwise providing mobile code (e.g., an applet) for end router operation. Delay management support engine 401 also similarly provides for the aforementioned transfer of configuration parameters or other information to one or more end routers (via loader-saver 402). Delay management support engine 401 is further configurable for providing such operations independently or responsively to a service application invocation (via service support engine 404), or for initiating end router loading of locally stored program code, parameters or other information or some combination thereof (e.g., augmenting or modifying end router information). Delay management support engine may be operable in an otherwise conventional manner. Loader-saver 402 provides for retrieving, transmitting or otherwise transferring information between or among service host 101 and one or more of storage 111a, third party systems (e.g., 201 of FIG. 2), end routers (e.g., 120a of FIG.

1) or other network system 100 components in response to invocation by other delay engine components.

Of the remaining illustrated delay engine components, delay relationship engine 403 provides for determining one or more presentation delay relationships in conjunction with delay management operation. Delay relationship engine 403 is configurable for invocation by service support engine 404 (in implementations supporting remote invocation or supplying of parameters, events or other information) or delay management support engine in other implementations. Service support engine 404 provides an service application interface that is operable responsive to invocation by service engine 110 (FIG. 1) by conducting information transfer with service engine 110 (e.g., an initial relationship, relationship changes during a presentation, user/user device parameters, and so on) or invoking other delay engine components for conducting corresponding operations (e.g., loader-saver transfer of relationship, time/event or other information to one or more end routers). Initial delay information engine 405 provides for determining the aforementioned initial delay parameters and transferring such parameters to one or more end routers. Security engine 406 is configurable for providing logon, encryption, compression or other security operations in delay management implementations that are operable without a support application conducted by a service host.

Figure 4B:
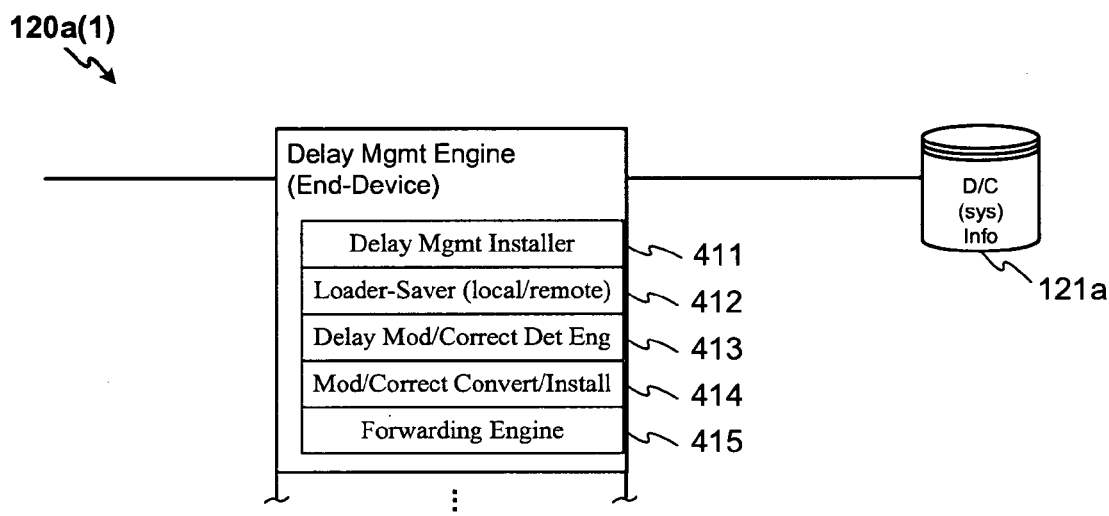
FIGS. 4b and 4c are flow diagrams illustrating a delay-convergence management engine according to an embodiment of the invention.
Figure 4C:
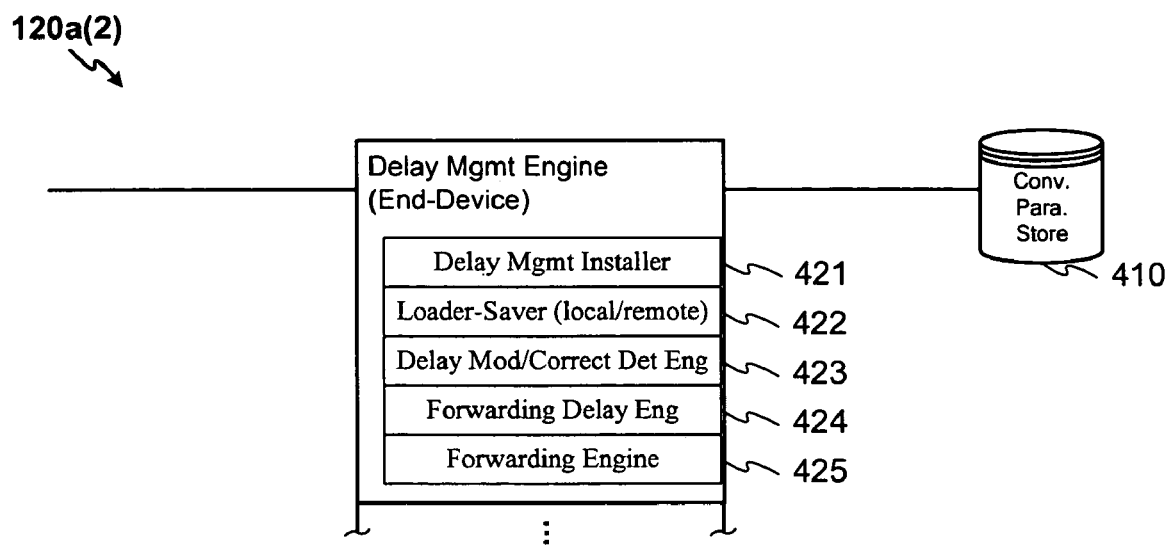

FIGS. 4b and 4c illustrates in greater detail a delay management engine of an end router (e.g., 120a of FIG. 1) according to embodiments of the invention. The delay management engine 120(1) of FIG. 4a is configured for operating in accordance with a trusted participant implementation, while engine 120(2) of FIG. 4b is configured for operating according to a tamper avoidance implementation.

Beginning with FIG. 4b, delay management engine 120(1) includes delay management installer 411, loader-saver 412, delay modification/correction determining engine (convergence engine) 413, modification/correction converter-installer engine (modification implementer) 414 and forwarding engine 415.

Delay management installer 411 provides, in implementations supporting offloading or replacing of delay management components, for installing delay management code or data information in a corresponding end router. Delay management installer may operate responsively to a delay engine 111a (FIG. 1) or other remote computing system sourcing of program code or other information, or of loading locally sourced code (e.g., stored in storage 121a) via loader-saver operation. Delay management installer 411 also provides for installing one or more delay relationship or delay information portions in conjunction with a presentation session. Loader-saver 412 provides for retrieving, transmitting or otherwise transferring information between or among service host 101 and one or more of storage 121a, third party systems (e.g., 201 of FIG. 2), service hosts (e.g., 101 of FIG. 1) user devices or other network system 100 components in response to invocation by other delay engine components.

Of the remaining illustrated delay management engine components, convergence engine 413 is operable in conjunction with loader-saver 412 for receiving or otherwise determining a delay relationship or delay information and prior delay information. Convergence engine 413 is also configurable for conducting delay modification or further delay convergence (e.g., prior delay modification correction). Modification implementer 414 provides an interface for implementing a current delay modification or delay convergence iteration. While delay management is more preferably conducted in conjunction with known common presentation and reporting protocols operating in conjunction with each user device, the possibility remains for such mechanisms to differ or be updated. Modification implementer provides for determining, in an otherwise conventional manner, a currently utilized such mechanism, converting or otherwise processing a determined modification as needed and transferring the delay modification to one or more corresponding user devices (via loader-saver 412). Forwarding engine 415 provides for receiving and forwarding media/control information between a media/control source (e.g., service host) and a user device. Forwarding engine 415 also provides for receiving presentation reporting information, storing applicable presentation reporting information (e.g., prior delay) and forwarding the report to another device (e.g., service host 101 (FIG. 1).

Continuing with FIG. 4c, delay management engine 120(2) is configured largely in the same manner as delay management engine 120(1) of FIG. 4b. As with delay management engine 120(1), delay management engine 120(2) includes a delay management installer 421, loader-saver 422, delay modification/correction determining engine (convergence engine) 423 and forwarding engine 425, which components may be operable in the same manner. Delay management engine 120(2), however, replaces or reconfigures the modification implementer 414 of engine 120(1) to instead provide a delay forwarding engine 424. Delay forwarding engine 424 provides for delaying the forwarding of received media to one or more corresponding user devices according to a current delay modification, and may be operated in manner already discussed.

Figure 5:
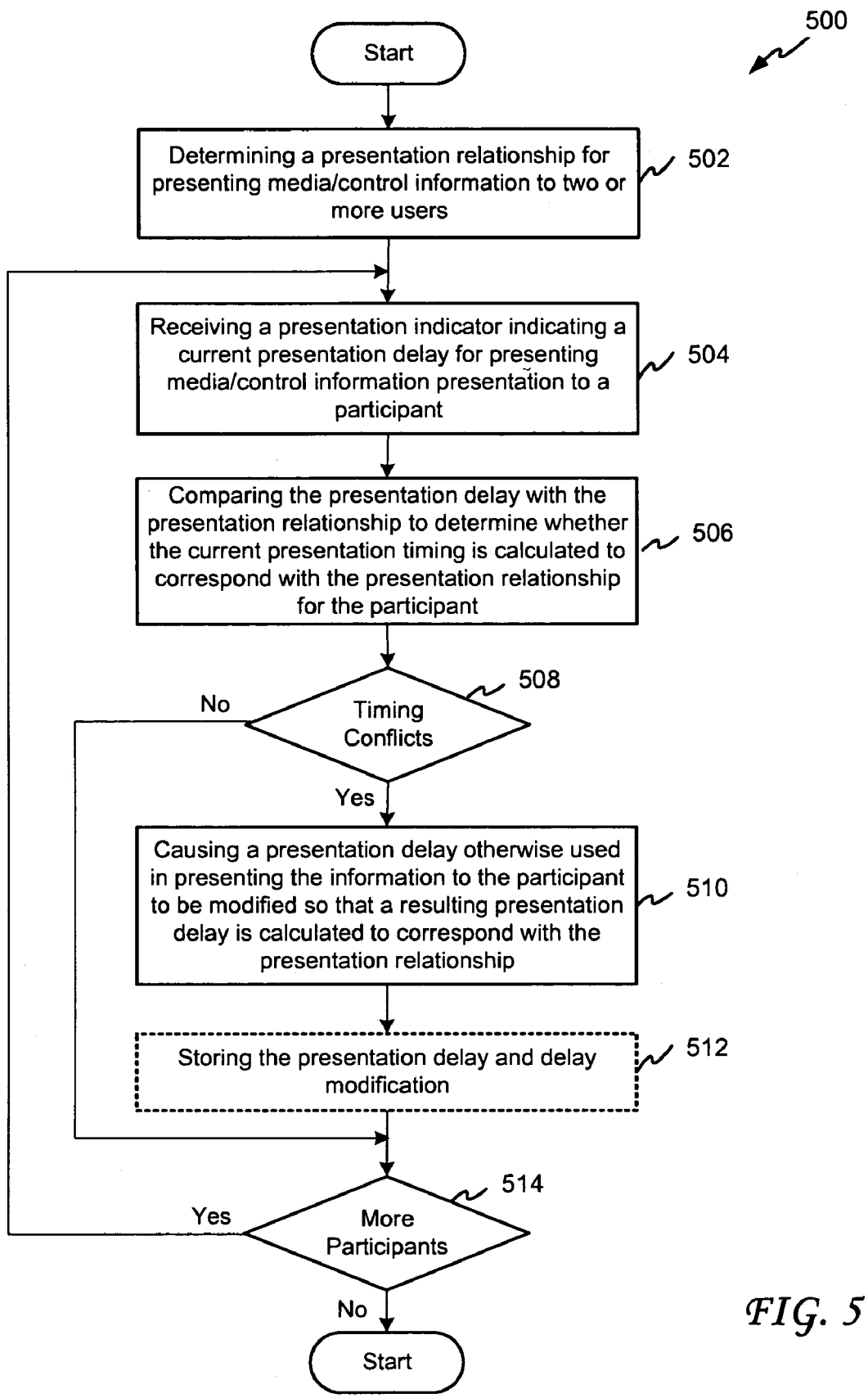
FIG. 5 is a flowchart illustrating a further delay managing method according to an embodiment of the invention.

Referring now to FIG. 5, there is seen a flow chart illustrating a delay management method 500 according to an embodiment of the invention. In block 502, a delay management system determines a presentation relationship (e.g., delay relationship) for presenting media or control information to two or more users. As discussed, a static or dynamic (variable) relationship may be determined by a delay management or service host engine, an end router (e.g., by receiving, retrieving or calculating a relationship) or one or more other system components, which may further include a facilitator or other user device. The relationship may further be determined according to service application, delay management system or user criteria (e.g., user status, infirmity, and so on).

In block 504, an end router receives a presentation indicator indicating a current presentation delay for presenting media or control information to a participant. While the same or similar information may be presented to more than one participant in conjunction with a service application, a participant user device may be configured for presenting information according to a different presentation delay. An RTCP presentation report or other reporting including a presentation delay indicator is therefore preferably provided by each participant user device. The indicator may be transferred to a corresponding end router or captured by an end router during a transfer to another component, or other mechanisms may be used or some combination.

In block 506, the end router compares the presentation delay with the presentation relationship to determine whether the current presentation timing is calculated to correspond with the presentation relationship corresponding to the participant. If, in block 508, such correspondence is not found, then, in block 510, the end router causes a presentation delay otherwise used to present the information to the participant to be modified so that a resulting presentation delay is calculated to correspond with the presentation relationship. If instead, in block 508, such correspondence is found, then the method proceeds to block 512, in which the presentation delay, the delay modification or other information may optionally be stored for performing a later convergence iteration. Presentation delay, delay modification, statistical or other information may also be stored or transferred to a service host or other computing system for delay management or service application updating, device operation coordination or other purposes. As was noted above, the presentation relationship may include concurrent or other timing, or may further provide for a fastest concurrent or other timing.

Block 514 causes blocks 504 through 510 to be repeated for other participants by one or more end routers corresponding to those participants. Delay management may be conducted for all or some participants or groups of participants in accordance with the requirements of a particular implementation.

Figure 6A:
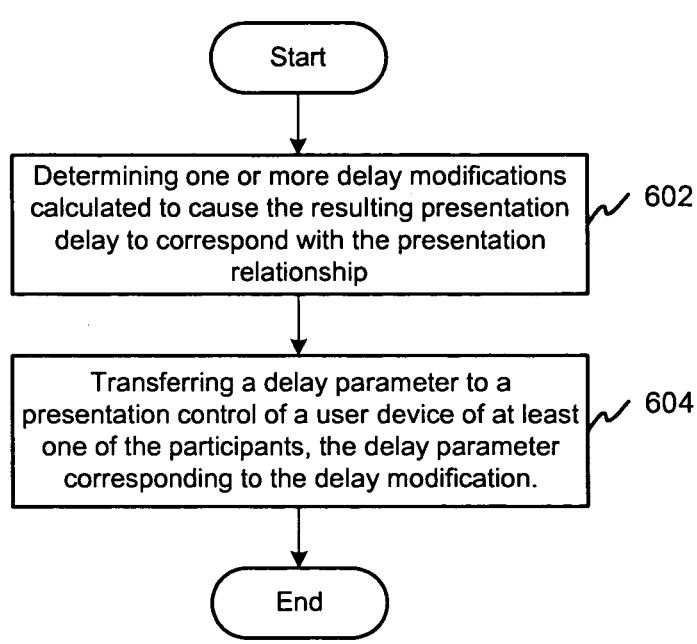
FIG. 6a is a flowchart illustrating a trusted participant implementation of the method of FIG. 5, according to an embodiment of the invention.

FIG. 6a illustrates an exemplary method for performing step 510 of FIG. 5 for each corresponding participant in accordance with a trusted participant embodiment. In block 602, an end router determines a delay modification calculated to cause a resulting presentation delay to correspond with the presentation relationship. The delay modification may, for example, be determined in various manners for an initial delay modification, by simple subtraction or as a convergence iteration (e.g., see above), or other mechanisms may be employed or some combination in accordance with the requirements of a particular implementation. In block 604, the end router transfers a delay parameter corresponding to the delay modification to a presentation control of a corresponding participant user device.

Figure 6B:
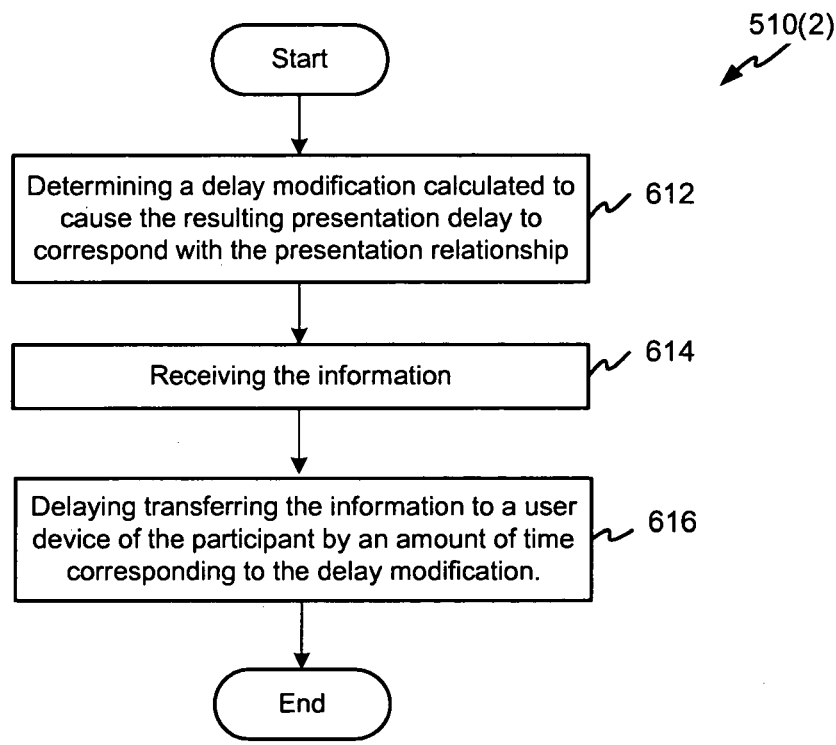
FIG. 6b is a flowchart illustrating a tamper avoidance implementation of the method of FIG. 5, according to an embodiment of the invention.

FIG. 6b illustrates a further exemplary method for performing step 510 of FIG. 5 for each corresponding participant in accordance with a tamper avoidance embodiment. In block 612, an end router determines a delay modification calculated to cause a resulting presentation delay to correspond with the presentation relationship, and may be performed in a similar manner as with step 602 of FIG. 6a. In block 614, the end router receives media or control information. (As was noted earlier, the media or control information may be provided synchronously or asynchronously with delay management operation.) In block 616, the end router delays transferring the information to the corresponding participant user device by an amount of time corresponding to the delay modification. The amount of time may be equal to the delay modification or determined by processing the delay modification in accordance with the requirements of a particular implementation.

Figure 7:
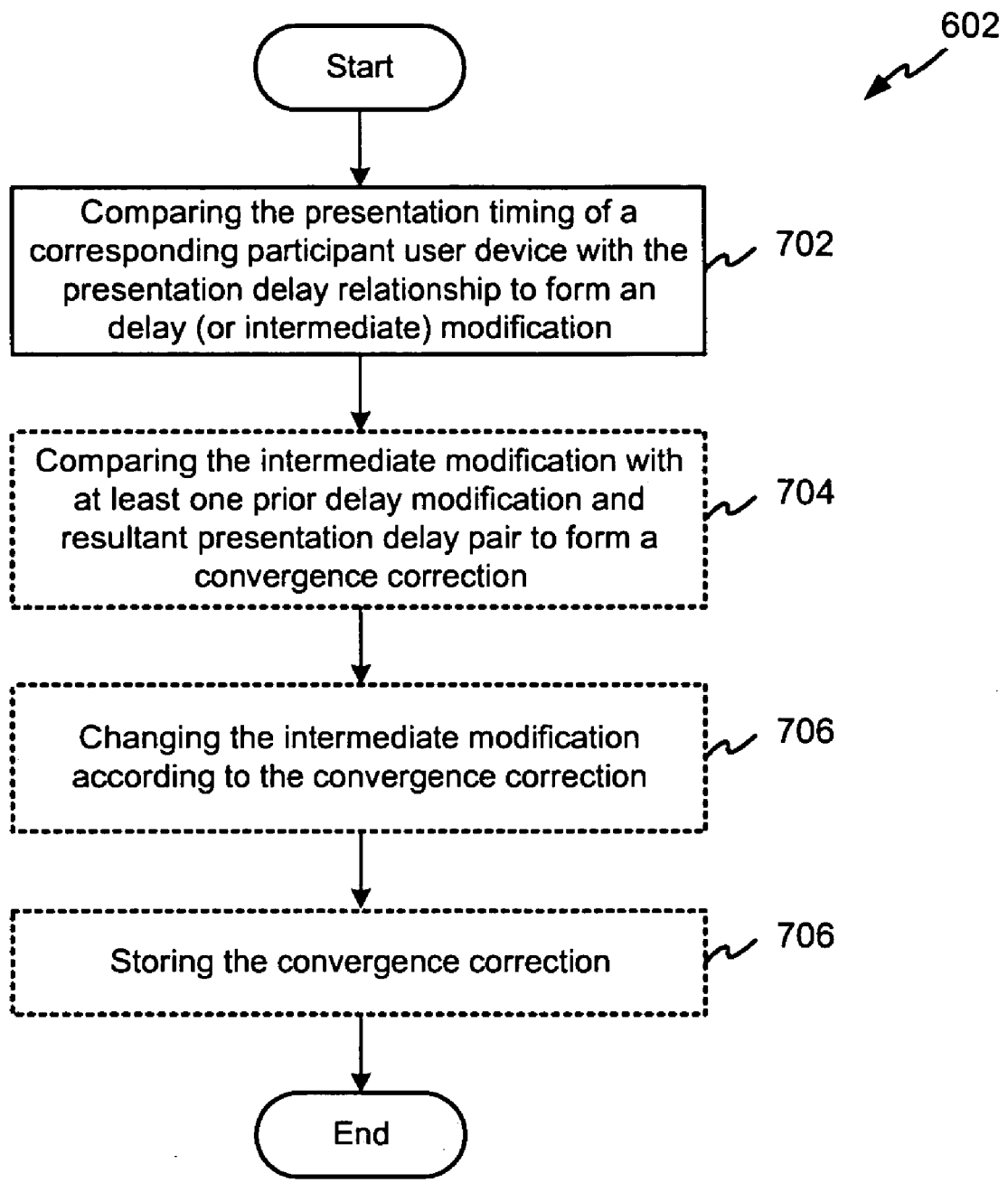
FIG. 7 is a flowchart illustrating determining of a delay modification in conjunction with a simple delay modification or convergence iteration delay modification according to embodiments of the invention.

FIG. 7 illustrates a method for determining a delay modification according to an embodiment of the invention. As shown, in item 702, the end router compares a (prior) presentation timing of a corresponding participant device with the presentation delay relationship to form a delay modification or, in an implementation in which convergence iteration operation is provided, to form an intermediate delay modification (in which case blocks 704 through 708 may further be performed). In block 704, the end router compares the intermediate modification with at least one prior delay modification and resultant presentation delay (resulting from causing the delay modification to be implemented) to form a convergence correction. In block 706, the end router modifies the intermediate modification according to the convergence correction. Block 708 further optionally provides for storing (or transferring) the convergence correction for use in a later convergence iteration, statistical reporting or other purposes in accordance with the requirements of a particular implementation.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A delay management method, comprising:
   determining whether a presentation timing for presenting information to two or more presentation participants at user devices during a presentation session is calculated to correspond with a predetermined presentation timing relationship;
   sending the information for presentation to the user devices during the presentation session, the information for presentation being received in the user devices at the presentation timing; and
   when the presentation timing is calculated to conflict with the predetermined presentation timing relationship:
      forming a delay modification corresponding to at least one of the user devices that is calculated to cause a presentation timing to the participant of the user device to correspond with the predetermined presentation timing relationship;
      transferring the delay modification to the user device, the delay modification being sent separately from the information for presentation, wherein the delay modification is calculated specifically for the user device to which the delay modification is sent; and
      causing in the user device receiving the delay modification, the presentation timing to the participant at the user device to be modified by an amount corresponding to the delay modification.

2. The delay management method of claim 1, wherein the determining comprises:
   receiving presentation timing information indicating a prior presentation timing to a participant at a user device during a current presentation session; and
   comparing the prior presentation timing with the predetermined presentation timing relationship.

3. The delay management method of claim 1, wherein the presentation timing includes one or more timing indicators indicating a presentation delay of a user device of at least one of the participants during a different presentation session.

4. The delay management method of claim 1, wherein the presentation timing includes a timing indicator corresponding to a presentation delay of a non-participant user device that corresponds to at least one of a participant user device and a presentation session characteristic.

5. The delay management method of claim 1, wherein the presentation timing includes one or more indicators corresponding to a presentation delay of a user device of a participant corresponding to information already presented to the participant during a current presentation session.

6. The delay management method of claim 1, wherein the forming comprises:
   calculating a difference between the presentation timing for a participant at a selected user device and the predetermined presentation delay relationship to form an intermediate delay modification;
   calculating a correction corresponding to at least one previous delay modification and a subsequent presentation timing for a participant at the selected user device; and
   modifying the intermediate delay modification according to the correction to form the delay modification.

7. The delay management method of claim 1, wherein the transferring comprises transferring a delay parameter to a presentation control of the user device, the delay parameter corresponding to the delay modification.

8. The delay management method of claim 1, wherein the causing the presentation timing to the participant at the user device to be modified comprises:
   receiving the information for presentation; and
   delaying sending the information for presentation in the user device by an amount of time corresponding to the delay modification.

9. A computer-readable storage medium having stored thereon instructions for:
   determining whether a presentation timing for presenting information to two or more presentation participants at user devices during a presentation session is calculated to correspond with a predetermined presentation timing relationship;
   sending the information for presentation to the user devices during the presentation session, the information for presentation being received in the user devices at the presentation timing; and
   when the presentation timing is calculated to conflict with the predetermined presentation timing relationship:
      forming a delay modification corresponding to at least one of the user devices that is calculated to cause a presentation timing to the participant of the user device to correspond with the predetermined presentation timing relationship;
      transferring the delay modification to the user device, the delay modification being sent separately from the information for presentation, wherein the delay modification is calculated specifically for the user device to which the delay modification is sent; and
      causing in the user device receiving the delay modification, the presentation timing to the participant at the user device to be modified by an amount corresponding to the delay modification.

10. A delay management apparatus, comprising:
    determining means for determining whether a presentation timing for presenting information to two or more presentation participants at user devices during a presentation session is calculated to correspond with a predetermined presentation timing relationship;
    sending means for sending the information for presentation to the user devices during the presentation session, the information for presentation being received in the user devices at the presentation timing; and
    when the presentation timing is calculated to conflict with the predetermined presentation timing relationship:
       forming means for forming a delay modification corresponding to at least one of the user devices that is calculated to cause a presentation timing to the participant of the user device to correspond with the predetermined presentation timing relationship;
       transferring means for transferring the delay modification to the user device, the delay modification being sent separately from the information for presentation, wherein the delay modification is calculated specifically for the user device to which the delay modification is sent; and
       delay implementing means for causing in the user device receiving the delay modification, the presentation timing to the participant at the user device to be modified by an amount corresponding to the delay modification.

11. The delay management apparatus of claim 10, wherein the delay implementing means comprises:
    means for receiving the information for presentation; and means for delaying sending the information for presentation in the user device by an amount of time corresponding to the presentation delay modification.

12. A delay management method, comprising:
receiving in one or more corresponding intra-network end devices, a presentation report including presentation delay information indicating a presentation delay of two or more user devices of participants in a media presentation session;
determining, in each end device for each corresponding user device, whether the presentation delay is calculated to correspond with a predetermined presentation timing relationship;
sending, from an intra-network end device, media information for presentation to each corresponding user device during the media presentation session, the media information for presentation being received in each corresponding user device with the presentation delay; and
when the presentation delay of a user device is calculated to conflict with the predetermined presentation timing relationship, then for each user device that is calculated to conflict:
determining in the corresponding end device a delay modification that is calculated to cause a resulting presentation delay to correspond with the predetermined presentation timing relationship;
transferring the delay modification from the corresponding end device to a user device calculated to conflict, the delay modification being sent separately from the media information for presentation, wherein the delay modification is calculated specifically for the user device to which the delay modification is sent; and
causing, in the user device, the delay modification to be implemented such that presentation of information by the user device is delayed by an amount that corresponds to the predetermined presentation timing relationship.

13. The delay management method of claim 12, wherein the transferring comprises transferring to the user device a delay parameter corresponding to the delay modification.

14. The delay management method of claim 12, wherein the causing comprises:
receiving information to be presented by the user device; and
delaying sending the information for presentation in the user device by an amount of time that corresponds to the delay modification.

15. A computer-readable storage medium having stored thereon instructions for:
receiving in one or more corresponding intra-network end devices, a presentation report including presentation delay information indicating a presentation delay of two or more user devices of participants in a media presentation session;
determining, in each end device for each corresponding user device, whether the presentation delay is calculated to correspond with a predetermined presentation timing relationship;
sending, from an intra-network end device, media information for presentation to each corresponding user device during the media presentation session, the media information for presentation being received in each corresponding user device with the presentation delay; and
when the presentation delay of a user device is calculated to conflict with the predetermined presentation timing relationship, then for each user device that is calculated to conflict:
determining in the corresponding end device a delay modification that is calculated to cause a resulting presentation delay to correspond with the predetermined presentation timing relationship;
transferring the delay modification from the corresponding end device to a user device calculated to conflict, the delay modification being sent separately from the media information for presentation, wherein the delay modification is calculated specifically for the user device to which the delay modification is sent; and
causing, in the user device, the delay modification to be implemented such that presentation of information by the user device is delayed by an amount that corresponds to the predetermined presentation timing relationship.

16. A delay management apparatus, comprising:
receiving means for receiving in one or more corresponding intra-network end devices, a presentation report including presentation delay information indicating a presentation delay of two or more user devices of participants in a media presentation session;
determining means for determining, in each end device for each corresponding user device, whether the presentation delay is calculated to correspond with a predetermined presentation timing relationship;
sending means for sending media information for presentation to the user devices during the media presentation session, the media information for presentation being received in the user devices at the presentation timing; and
implementation means for, when the presentation delay of at least one of the user devices is calculated to conflict with the predetermined presentation timing relationship, then for each user device that is calculated to conflict:
determining in the corresponding end device a delay modification that is calculated to cause a resulting presentation delay to correspond with the predetermined presentation timing relationship;
transferring the delay modification from the corresponding end device to a user device calculated to conflict, the delay modification being sent separately from the media information for presentation, wherein the delay modification is calculated specifically for the user device to which the delay modification is sent; and
causing, in the user device, the delay modification to be implemented such that presentation of information by the user device is delayed by an amount that corresponds to the predetermined presentation timing relationship.

17. A delay management apparatus, comprising:
a network interface that is coupled a data network for receiving one or more packet flows therefrom;
a processor coupled to the network interface; and
one or more stored sequences of instructions which, when executed by the processor, cause the processor to carry out the steps of:
receiving in one or more corresponding intra-network end devices, a presentation report including presentation delay information indicating a presentation delay of two or more user devices of participants in a media presentation session;
determining, in each end device for each corresponding user device, whether the presentation delay is calculated to correspond with a predetermined presentation timing relationship;
sending media information for presentation to each corresponding user device during the media presentation session, the media information for presentation being received in each corresponding user device with the presentation delay; and when the presentation delay of a user device is calculated to conflict with the predetermined presentation timing relationship, then for each user device that is calculated to conflict:

determining in the corresponding end device a delay modification that is calculated to cause a resulting presentation delay to correspond with the predetermined presentation timing relationship;

transferring the delay modification from the corresponding end device to a user device calculated to conflict, the delay modification being sent separately from the media information for presentation, wherein the delay modification is calculated specifically for the user device to which the delay modification is sent; and causing, in the user device, the delay modification to be implemented such that presentation of information by the user device is delayed by an amount that corresponds to the predetermined presentation timing relationship.

18. A delay management method, comprising:

receiving using a presentation system in a user device, at least one of media and control information presentation, the information for presentation having a presentation delay;

receiving using the presentation system in the user device, a delay modification calculated to cause the presentation delay for the at least one of the media and the control information for the presentation system in the user device to correspond to presentation delays of one or more other presentation systems at other user devices, the delay modification being received separately from the information for presentation, wherein the delay modification is calculated specifically for the user device receiving the delay modification; and modifying using the presentation system in the user device, according to the delay modification, a presentation delay otherwise implemented by the presentation system for presenting the information in the user device.

19. A delay management system, comprising:

a network system providing media to one or more user devices, the media information for presentation being sent to the user devices during a presentation session, the media information for presentation being received in each user device with a presentation delay;

two or more presentation systems at user devices coupled to the network system for presenting the media; and a delay management engine coupled to the network system, the delay management engine being configured to transfer a delay modification to the one or more user devices for modification in the one or more user devices of a presentation timing of the presentation system for the media by an amount calculated to conform to a predetermined delay relationship, the delay modification being sent separately from the media for presentation, wherein the delay modification is calculated specifically for the user device to which the delay modification is sent.

20. A delay management apparatus, comprising:

a network interface that is coupled a data network for receiving one or more packet flows therefrom;

a processor coupled to the network interface; and one or more stored sequences of instructions which, when executed by the processor, cause the processor to carry out the steps of:

determining whether a presentation timing for presenting information to two or more presentation participants at user devices during a presentation session is calculated to correspond with a predetermined presentation timing relationship;

sending the information for presentation to the user devices during the presentation session, the information for presentation being received in the user devices at the presentation timing; and when the presentation timing is calculated to conflict with the predetermined presentation timing relationship:

forming a delay modification corresponding to at least one of the user devices that is calculated to cause a presentation timing to the participant of the user device to correspond with the predetermined presentation timing relationship;

transferring the delay modification to the user device, the delay modification being sent separately from the information for presentation, wherein the delay modification is calculated specifically for the user device to which the delay modification is sent; and causing in the user device receiving the delay modification, the presentation timing to the participant at the user device to be modified by an amount corresponding to the delay modification.

* * * * *